United States Patent [19]
Cone et al.

[11] Patent Number: 5,257,799
[45] Date of Patent: Nov. 2, 1993

[54] FOLDABLE STROLLER

[75] Inventors: Richard E. Cone, Dayton, Ohio; Dennis M. Turner, Columbus, Ind.

[73] Assignee: Cosco, Inc., Columbus, Ind.

[21] Appl. No.: 771,602

[22] Filed: Oct. 4, 1991

[51] Int. Cl.⁵ .............................................. B62B 7/08
[52] U.S. Cl. ................... 280/642; 280/650; 280/47.36; 280/47.371; 297/48
[58] Field of Search .............. 280/641, 642, 647, 650, 280/47.36, 47.371, 47.38, 47.4, 657, 658; 297/46, 48, DIG. 4

[56] References Cited

U.S. PATENT DOCUMENTS

| | | |
|---|---|---|
| 4,191,397 | 3/1980 | Kassai . |
| 4,216,974 | 8/1980 | Kassai . |
| 4,280,716 | 7/1981 | Vonsbaek et al. ................ 280/642 |
| 4,412,688 | 11/1983 | Giordani . |
| 4,544,178 | 10/1985 | Al-Sheikh et al. ................ 280/642 |
| 4,606,550 | 8/1986 | Cone . |
| 4,610,460 | 9/1986 | Kassai . |
| 4,725,071 | 2/1988 | Shamie . |
| 4,736,959 | 4/1988 | Steenburg .................. 280/47.4 X |
| 4,834,403 | 5/1989 | Yanus et al. . |
| 4,892,327 | 1/1990 | Cabagnero . |

OTHER PUBLICATIONS

Century Advertising Literature, p. 32, date unknown.
Aprica Advertising literature, pp. 1-8, date unknown.
Century Advertising literature, pp. 33-37, date unknown.
Aprica Advertising literature, pp. 1-14, date unknown.
Prodigy Corp. Advertising literature, pp. 1-5, date unknown.
Graco Advertising literature, pp. 1-5, date unknown.
Combi Advertising literature, pp. 1-5, date unknown.
Omnibus Advertising literature, p. 22, date unknown.

Primary Examiner—Margaret A. Focarino
Assistant Examiner—Michael Mar
Attorney, Agent, or Firm—Barnes & Thornburg

[57] ABSTRACT

A foldable stroller is provided for transporting a child. The stroller has a seat unit including a rigid panel-like seat bottom and back joined together with a collapsible frame assembly. A control hub is provided to enable a user to release the back and then move the back with one hand from its normal upright position forwardly toward the seat bottom to collapse the seat unit and frame into a compact folded stroller.

34 Claims, 8 Drawing Sheets

FOLDABLE STROLLER

BACKGROUND AND SUMMARY OF THE INVENTION

The present invention relates to foldable strollers or seats of the type which may be supported on wheels, and more particularly to the provision of a foldable stroller or seat which has a seat unit including rigid panel-like seat bottom and back joined together with a frame assembly and a control hub arrangement such that the back can be released and moved with one hand from its normal use position and folded forwardly toward the seat bottom to collapse the entire assembly into a very compact storage unit.

Foldable strollers and seats are well known in the art. There are many examples of strollers and seats which can be folded from their use positions to their storage positions. The stroller or seat of the present invention is novel, not because it is foldable, but because of the manner in which its components, assemblies and units are constructed and connected together by a novel hub arrangement to promote very easy, one-handed control and movement of the stroller or seat from its upright use position to its collapsed storage position.

The present invention, therefore, is a foldable seat comprising a seat unit comprising a back and a seat bottom, the back and seat bottom being relatively movable and the back being collapsible toward the seat bottom as it moves toward a non-use storage position, a collapsible frame assembly comprising a front leg unit and a rear leg unit and a rear leg unit, a push handle, and hub means for providing pivot axes for the seat unit, frame assembly and handle, all of the pivot axes being horizontal and generally parallel. The hub means also comprises means for locking the frame assembly to the seat unit and means for releasing the locking means when the back is moved toward its non-use storage position.

More specifically, the present invention is a foldable seat comprising a seat unit comprising a back and a seat bottom connected to a lower portion of the back for movement about a horizontal seat unit pivot axis, a collapsible frame assembly comprising a front leg unit and a rear leg unit, a push handle, and hub means for providing a plurality of pivot axes, respectively, for the back, front leg unit, rear leg unit and push handle, all of the pivot axes being horizontal and generally parallel. The hub means also comprises means for locking the frame assembly to the back and means for releasing the locking means when the back is moved toward its folded storage position.

In this specification and the appended claims, the term "stroller" shall include the term "seat."

A stroller made in accordance with the present invention, therefore, may preferably comprise a seat unit, a collapsible frame assembly movable between an unfolded use position and a folded storage position, hub means for attaching the seat unit to the collapsible frame assembly for movement relative to the assembly when the assembly is moved between its use and storage positions, and a push handle movable relative to the seat unit between at least two operating positions, for instance, one position to move the stroller in a forward direction and the other position to move the stroller in the rearward direction. The stroller may preferably further comprise means for pivotably connecting the push handle to the hub means for movement about a first pivot axis relative to the seat unit between its two operating positions, handle locking means on the push handle for normally locking the push handle to the hub means to fix the push handle in one of its operating positions and means for releasing the handle locking means for movement to each of its operating positions.

This stroller is assembled with the push handle locking means and the hub means arranged such that a person may hold the handle and actuate the handle locking means with the same hand and manipulate and move the push handle to its positions. The collapsible frame assembly includes a front leg unit pivotably coupled to the hub means for movement about a second pivot axis and a rear leg unit pivotably coupled to the hub means for movement about a third pivot axis, the first, second and third pivot axes being horizontal and generally parallel to establish the foldable nature of the stroller. That is, the push handle folds about a horizontal axis and the leg units of the collapsible frame assembly pivot about generally parallel horizontal axes, all of which are defined by the hub means.

The stroller of the present invention may preferably be constructed such that the seat unit includes a seat, a back, and means for pivotably coupling the back to the seat about a seat unit pivot axis which is also horizontal and generally parallel to the first, second and third axes. The stroller may preferably comprise back locking means for releasably locking the back to the hub means to block movement of the back relative to the collapsible frame assembly. In the illustrative and preferred embodiment of the present invention, the back locking means includes a handle including a grip portion and a locking tab, means for slidably mounting the handle to the back, and spring means for yieldably urging the locking tab into slot means provided by the hub means to retain the back in one of its fixed positions. This handle may be actuated by an operator placing one hand on the back and, with the same hand, gripping the handle to release the back from the hub means for folding the back forwardly toward the seat to place the stroller in its folded, storage position. This movement of the back operates through the hub means to release the collapsible frame assembly. The illustrative and preferred back is pivotably coupled to the hub means for movement about the first pivot axis, i.e., the same pivot axis as the push handle pivot axis, and the seat is connected to the lower portion of the back for pivotal movement about the seat unit pivot axis. In the illustrative and preferred embodiment, therefore, the hub means includes a back lock hub and a handle lock plate adjacent to the back lock hub, and the back lock hub is situated between the seat unit and the handle lock plate.

It is an object of the present invention, therefore, to provide a foldable stroller comprising a seat unit, a collapsible frame assembly movable between an unfolded use position and a folded storage position, hub means for attaching the seat unit to the collapsible frame assembly for movement relative to the assembly when it is moved between its use and storage positions, a push handle movable relative to the seat unit between at least two operating positions, means for pivotably connecting the push handle to the hub means for movement about a first pivot axis relative to the seat unit between its two operating positions, handle locking means on the push handle for normally locking the push handle to the hub means to fix the push handle in one of its operating positions and means for releasing the locking means to permit movement of the push handle relative to the seat unit to each of its operating positions.

Another object of the present invention is to provide a foldable stroller comprising a seat unit including a seat and a back, means for pivotably coupling the back to the seat for movement about a seat unit pivot axis, a collapsible frame assembly movable between an unfolded use position and a folded storage position, hub means for pivotably coupling the back to the collapsible frame assembly for movement relative to the frame assembly about a first pivot axis so that the seat is free to move relative to the collapsible frame assembly and to pivot relative to the back about the seat unit pivot axis during movement of the back relative to the collapsible frame assembly, and back locking means for releasably locking the back to the collapsible frame assembly to block movement of the back relative to the collapsible frame assembly so that the back and seat are retained in a selected fixed position relative to one another and to the collapsible frame assembly. In this invention, the back locking means include a handle which may be gripped with one hand to release the back for movement, and the pivotal movement of the back about the hub means operates through the hub means to release the frame assembly for collapsing about the aforesaid second and third pivot axes defined by the hub means for movement of the leg units.

Still another object of the present invention is to provide a foldable stroller comprising a seat unit including a seat and a back, means for pivotably coupling the back to the seat for movement about a seat unit pivot axis, a collapsible frame assembly movable between an unfolded use position and a folded storage position, hub means for pivotably coupling the back to the collapsible frame assembly for movement relative to the collapsible frame assembly about a first pivot axis during movement of the back relative to the seat about the seat unit pivot axis, frame locking means for locking the hub means to the collapsible frame assembly to block movement of the collapsible frame assembly from its unfolded use position to its folded storage position and control means on the hub means for releasing the frame locking means during pivoting movement of the back about the first pivot axis toward the seat so that the collapsible frame assembly is movable from its unfolded use position to its folded storage position.

A novel feature of the present invention is the manner in which the wheels are mounted to have a very effective shock absorber system. It is a further object of the present invention to provide a wheel assembly comprising a support sleeve, means for mounting the support sleeve to a distal end of the stroller leg, a wheel support member, a wheel rotatably mounted on the wheel support member for rotation about an axis of rotation, means for coupling the wheel support member to the support sleeve for pivotable movement about a horizontal pivot axis so that the wheel support member is pivotable to move the wheel in a use position and a shock-absorbing position, the wheel support member being configured to locate the axis of rotation of the wheel in offset relation to a central axis of the stroller leg when the wheel is moved to its use position, and shock absorber means for yieldably pivoting the wheel support member about the horizontal pivot axis to move the wheel normally to its use position in offset spaced-apart relation to the central axis of the stroller leg, the shock absorber means including a curved supporting post appended to the support sleeve and a compression spring mounted on the curved supporting post.

Other objects and features of the present invention will become apparent as this description progresses.

BRIEF DESCRIPTION OF THE DRAWINGS

The detailed description particularly refers to the accompanying figures in which.

DETAILED DESCRIPTION OF THE DRAWINGS

Turning to the drawings, it will be seen that a foldable stroller 10 comprising a seat unit 12 is illustrated, the seat unit 12 including a seat or seat bottom 14 and a relatively movable seat back 16. The stroller 10 comprises a collapsible frame assembly 24 movable between an unfolded use position shown in FIG. 1 and a folded storage position shown in FIG. 10. The various conditions and positions of the frame assembly will be discussed in connection with FIGS. 7-10. The frame assembly 24 comprises a front leg unit 26, a rear leg unit 28, and a U-shaped tubular member 29. It will be appreciated that each leg unit 26, 28 is formed by a right-side leg and a left-side leg in a conventional manner. Each leg is also supported by wheel means 30 to be described in more detail hereinafter.

Hub means 40 is provided for attaching the seat unit 12 to the collapsible frame assembly 24 for movement relative to the frame assembly 24 during movement of the assembly 24 between its aforesaid use and storage positions. It will be appreciated, as this description progresses, that hub means 40 is a central control or control unit for positioning and controlling the various assemblies and units of the stroller 10. While hub means 40 is shown in the drawings on the right-hand side of the stroller 10, it will be appreciated that similar hub means is provided at a corresponding location at the left-hand side of the stroller.

Figures 1, 2:
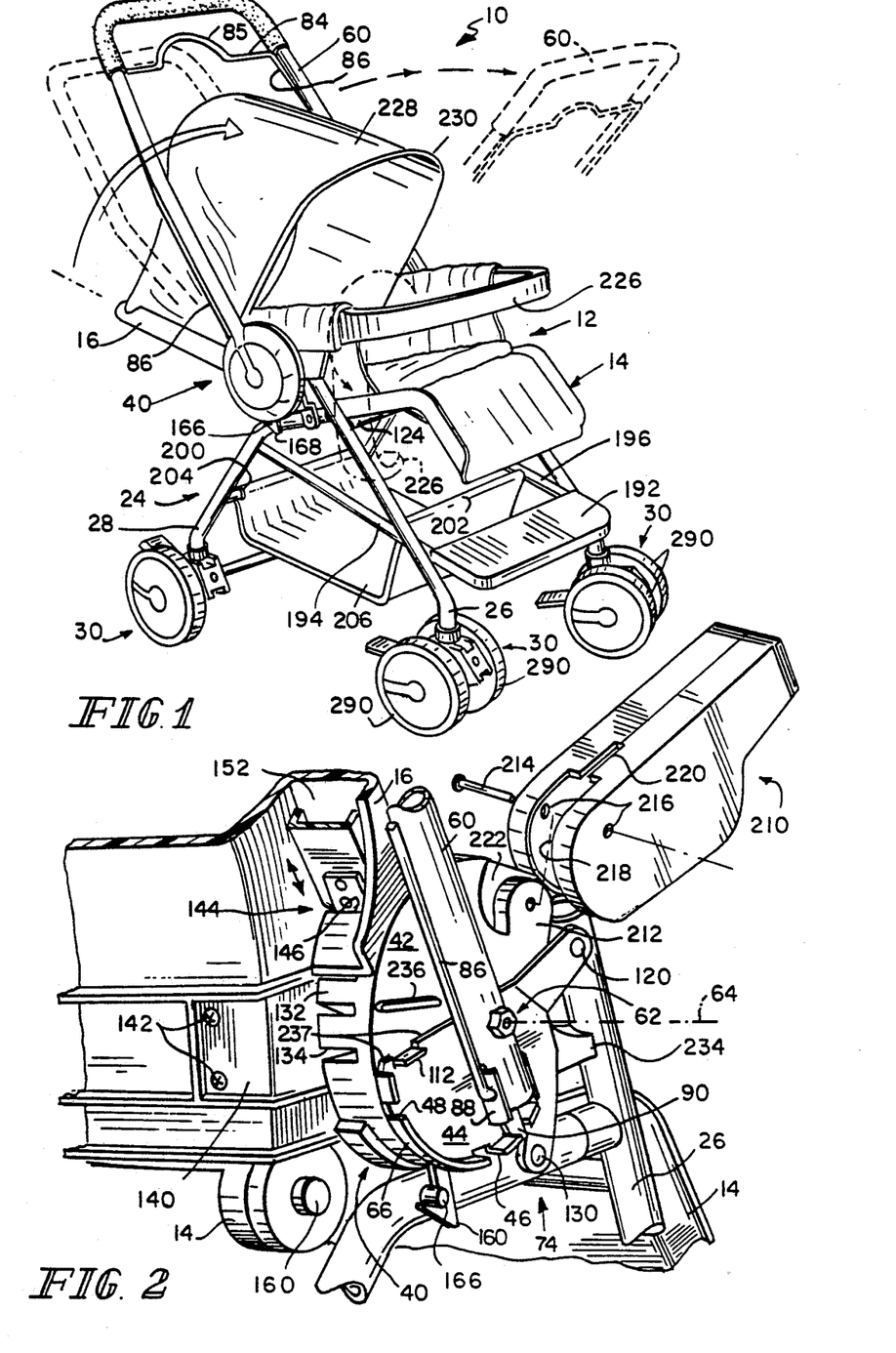
FIG. 1 is a perspective view of the stroller of the present invention.
FIG. 2 is a fragmentary perspective view of the hub means of the stroller of the present invention.

While hub means 40 is shown covered for aesthetic and safety reasons in FIG. 1, the details of the illustrative hub means are shown in FIGS. 2-6 to illustrate its functions. For example, hub means 40 includes a latch hub or back lock hub 42 and a handle lock plate 44, both clearly shown in FIGS. 2 and 4. The handle lock plate 44 may be mounted to lie adjacent to the latch hub 42 for movement about a first pivot axis 64 (the hub means axis) to be described hereinafter. The handle lock plate 44 is able to pivot a small amount about axis 64 relative to the back lock hub 42 during collapsing and unfolding of the stroller 10. This "lost motion" between handle lock plate 44 and the back lock hub 42 is useful in permitting the stroller 10 to collapse fully to the position shown in FIG. 10. As will be described, stops 236 and 234 function to limit such lost motion.

The latch hub 42 is shown situated between the seat unit 12 and the handle lock plate 44, and the handle lock plate 44 is formed to include first slot means 46, 46a and second slot means 48 for establishing first and second operating positions, respectively, for a push handle 60. The push handle 60 is movable relative to the seat unit 12 between at least two operating positions shown in FIG. 1, with the slot means 46 or 46a controlling the solid line position for forward movement and the slot means 48 controlling the broken line position for rearward movement. The two closely spaced slot means 46, 46a are provided for height adjustment of the push handle 60. In FIG. 1, the push handle 60 is shown in the upper position, while in FIG. 2 the push handle 60 is shown locked in the lower position.

Illustratively, means 62 is provided for pivotably connecting the push handle 60 to the hub means 40 for movement about a first axis 64 (FIG. 2) relative to the seat unit 12 between the said at least two operating positions defined by the slot means 46, 46a and 48. A handle locking means 74 is provided on the push handle 60 for normally locking the push handle 60 to the hub means 40 to fix the push handle in one of the operating positions so that the push handle is retained in a predetermined fixed position relative to the hub means 40. In the illustrated embodiment, the push handle 60 is lockable to the handle locking plate 44 included in hub means 40.

Then, illustratively, releasing means 84 is provided for releasing the handle locking means 74 to permit movement of the push handle 60 relative to the seat unit 12 to each of its operating positions. The releasing means 84 comprises a hand-grip portion 85 at the top of the push handle 60 which can be pulled upwardly by one hand which is resting on the handle and which is connected by means of control rods 86 to a handle lock member 88 which carries a lug or tab 90 (FIGS. 2 and 4) which engages into either slot means 46, 46a or slot means 48 formed in the handle locking plate 44. Spring means 100 (FIG. 4) urges the lug 90 normally into engagement with either slot means 46, 46a or slot means 48. It will be seen that the illustrative spring means 100 is a compression spring that is disposed in the tubular handle 60 below the pivot means 62 and that the control rod 86 is connected to the handle lock member 88 by a projecting portion 102 which extends through slots 104 (FIG. 4) in the tubular handle 60. Essentially, in the illustrative embodiment, the slot means 46, 46a and 48 are formed in a peripherally and laterally outwardly-extending curved flange 66 which is concentric with the pivot axis 64 of the handle 60. The handle lock plate 44 also is formed with stop means 112,113 that will limit the pivoting movement of the handle 60 relative to the handle lock plate 44.

Figure 4:
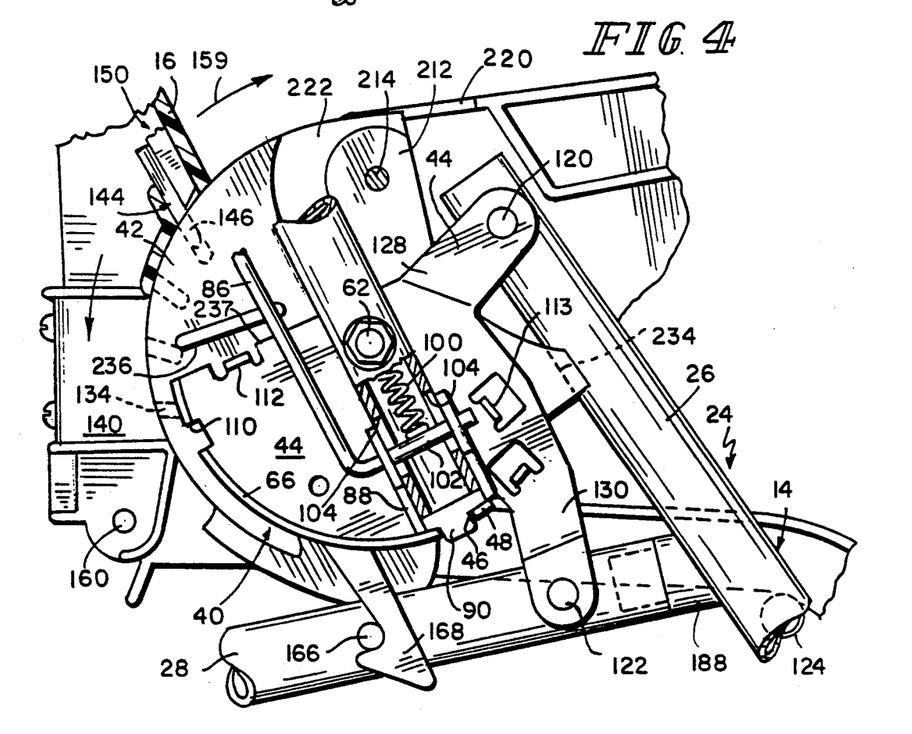
FIG. 4 is a fragmentary elevational view of the hub means with the cover removed to show a portion of the control mechanism.
Figure 5:
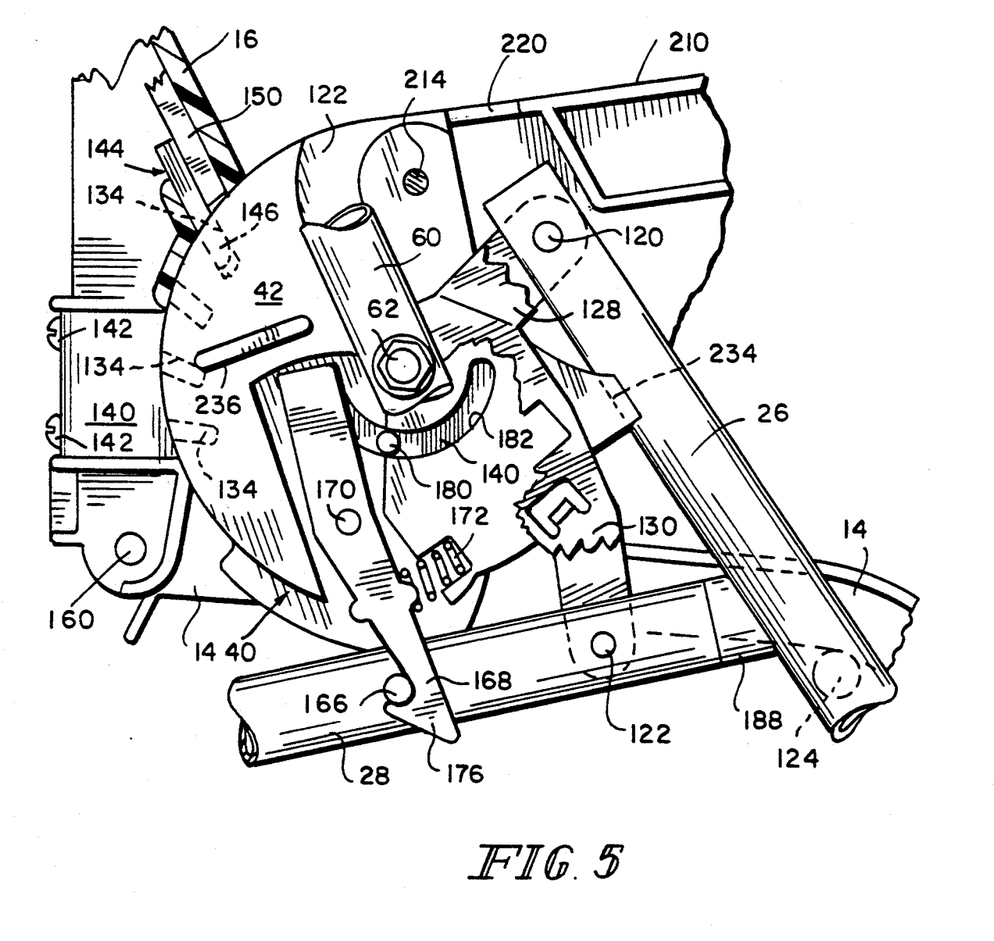
FIG. 5 is another fragmentary elevational view showing the control function of the hub means.
Figure 6:
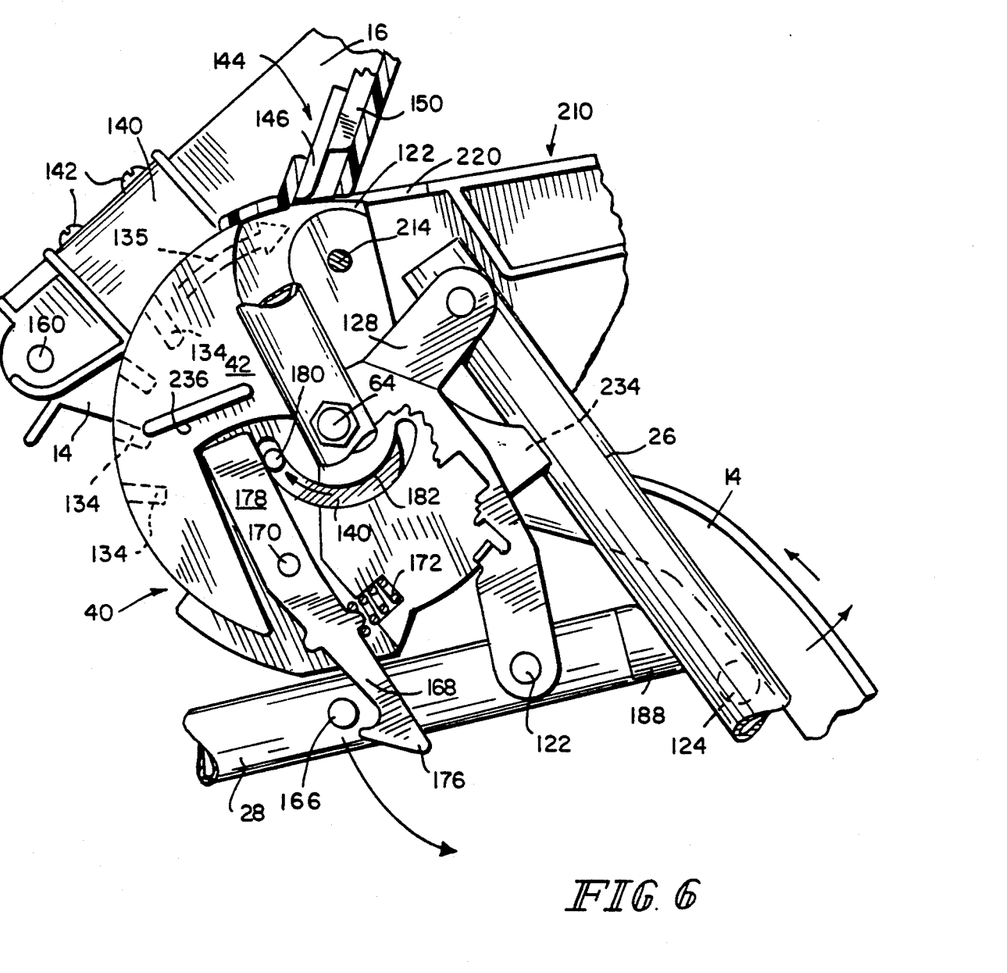
FIG. 6 is another fragmentary sectional view showing the control function of the hub means.

The illustrative front leg unit 26 is pivotably coupled to the hub means 40 for movement about a second pivot axis or pivot pin 120 clearly seen in FIGS. 4-6. Similarly, the rear leg unit 28 is pivotably coupled to the hub means 40 for movement about a third pivot axis or pivot pin 122 which is below the pivot axis 120. As perhaps best seen in FIGS. 5 and 6 and partially in FIG. 1, a cross brace rod 124 extends between the right and left legs of the front leg unit 26 to provide a support upon which the bottom 14 of the seat unit 12 moves or slides. That is, as the seat unit 12 moves relative to the frame assembly 24 or vice versa, the bottom 14 slides on the rod 124.

Further, in the illustrative embodiment, the handle lock plate 44 of the hub means 40 is formed with a forwardly- and upwardly-extending portion 128 providing the support for the pivot pin 120 and a downwardly and forwardly-extending portion 129 providing the support for the pivot pin 122. The left-hand portion of the latch hub 42 is generally concentrically formed about the axis 64 (first pivot axis for handle 60), and a major concentric portion of the latch hub 42 includes a peripherally and laterally inwardly-extending flange 132 which is formed with some peripherally spaced-apart "back locking" slots 134 as shown best in FIGS. 2, 4, 5 and 6. An illustrative feature of the present invention is that the seat unit 12 is pivotably coupled to the hub means 40 for movement about the first pivot axis 64, i.e., the pivot axis for the handle 60. Illustratively, the back 16 is mounted on a pivot bracket 140 by means of fastening elements 142 and the pivot bracket 140 moves about the axis 64, for instance, as illustrated in FIGS. 4, 5 and 6. The back locking slots 134 in the latch hub 42 provide at least third and fourth slot means that control the position of the back 16 relative to the latch hub 42 in the use position of the stroller 10.

Figure 3:
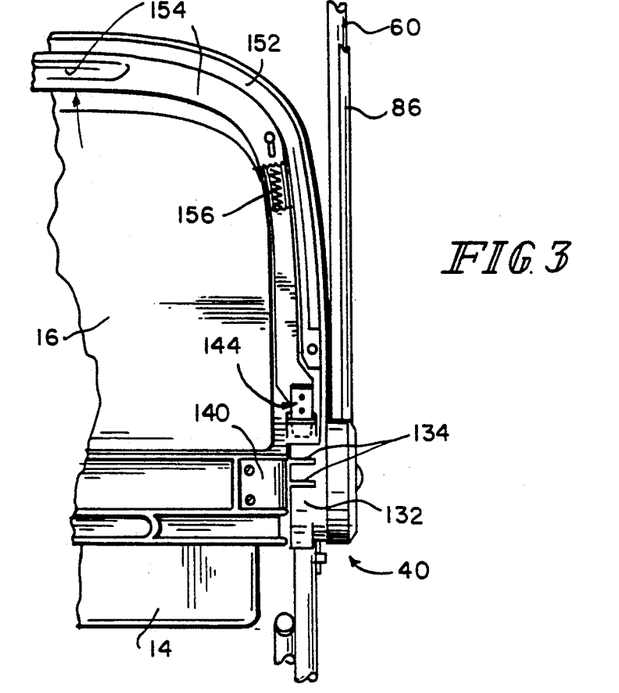
FIG. 3 is a fragmentary back view of a portion of the back and the hub means of the stroller of the present invention.

The stroller 10 further comprises seat locking means 144 on the seat unit 12 for locking the seat unit (and in particular the back 16) to the hub means 40, the seat locking means 144 illustratively comprising a locking tab 146 which is carried by the back 16 of seat unit 12 to engage selectively into the slots 134. The illustrative locking tab 146 is carried by a lock handle 150 mounted on the back 16 for sliding movement, perhaps best seen in FIG. 3. Illustratively, the handle 150 is U-shaped and corresponds to the shape of the upper portion of the back 16 and is held there for some movement to move tab 146. Illustratively, the handle 150 may be arranged to have a shape which fits in a contoured groove 152 in back 16 and to provide a hand-grip portion 154 at the upper portion of the back 16. Spring means 156 is provided for acting against the back 16 and urging the locking tab 146 into engagement with the flange 132 on the latch hub 42 and particularly into one of the back locking slots 134 formed in the flange 132 (FIG. 3). Thus, the position of the seat unit 12, and particularly the back 16 of the seat unit 12, is changed by actuating the hand-grip portion 154 against the spring means 156 to release the seat unit from the hub means 40.

In the illustrative embodiment, the seat or seat bottom 14 is pivotably coupled to the back 16 by the pin 160 (FIGS. 4, 5 and 6). That is, illustratively, the back 16 is pivoted to the hub means 40 for pivotal movement about the first pivot axis 64 and the seat or seat bottom 14 is pivotably connected to the lower portion of the back 16 below and to the left of the axis 64 in the drawings.

Looking specifically at FIGS. 4-6, it will be seen that, as the seat back 16 is pivoted counterclockwise about the pivot axis 64 of the hub means 40, the pivot pin 160 will move to the right to move the seat bottom 14 to the right on the rod 124. In other words, the position of the bottom 14 is controlled by the position of the back 16 through the pivot pin 160 and by the sliding movement of the bottom 14 on the cross brace rod 124 included in the front leg unit 26.

The hub means 40 also provides a connection between the back 16 and the rear leg unit 28 such that, when the back 16 is disengaged for pivotal movement about the axis 64 to the right or counterclockwise from the back locking slots 134, that movement will disengage the hub means 40 from the rear leg unit 28 of the collapsible frame assembly 24 so that the frame assembly 24 can be moved to its storage position. Illustratively, this interaction is provided by a lock post 166 on rear leg unit 28 which is engaged by a hooked lever 168 pivotably mounted on latch hub 42 as indicated at 170 (FIG. 5) and biased clockwise by spring means indicated at 172. Essentially, the spring means 172 acts, for example, against the hub means 40 to move the hooked lever 168 clockwise about its axis on the hub means 40 into engagement with the lock post 166. Illustratively, the hooked lever 168 has (FIG. 6) a hook portion 176 extending downwardly from its pivot pin axis 170 and a cam portion 178 extending upwardly from the pivot axis pin 170. As best seen in FIG. 6, a driver or cam member 180 moves in an arcuate slot 182 about the axis 64 to engage the cam portion 178 and move the hook portion 176 counterclockwise out of engagement with the lock post 166 on the rear leg unit 28. This driver 180 is carried on an extension portion of the bracket 140 that is rigidly fixed to the back 16 to move when the seat back 16 moves clockwise from its position in FIG. 5 to disengage the rear leg unit 28.

The forward portion of the rear leg unit 28 may conventionally be provided with a stop 188 to engage and position the front leg unit 26 (FIGS. 5 and 6). Thus, once the back 16 is disengaged from the hub means 40 such that it can turn clockwise as viewed in FIG. 6 about the axis 64, the rear leg unit 28 will be disengaged from the hub means 40 to provide for movement of the collapsible frame assembly 24.

Figure 7:
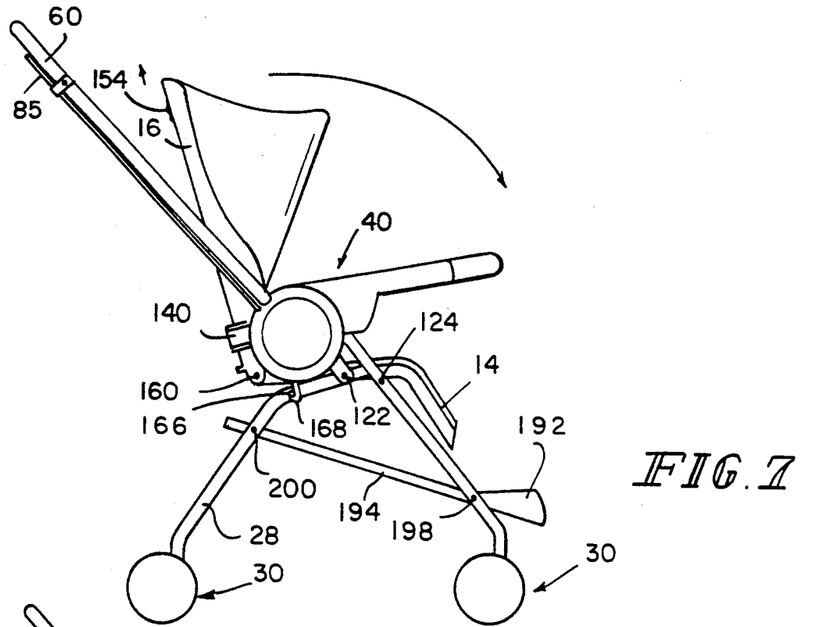
FIG. 7 shows a diagrammatic elevational view of the stroller in its use position.

Further to stabilize the collapsible frame assembly 24, particularly to provide rigidity between the front and rear leg units 26,28, a foot rest 192 is provided. Illustratively, the foot rest 192 is a front platform formed on a U-shaped tubular member 29, the legs 194,196 of which extend between the front and rear leg units 26,28 as shown best in FIG. 1. Each leg 194,196 is pivotably connected as indicated at 198 to the front leg unit 26 and at 200 to the rear leg unit 28 (FIG. 7). Lateral stability between the right- and left-hand side legs of the front and rear leg units 26, 28 may also be provided by rigid cross brace rods 202, 204 best seen in FIG. 1. A cloth basket 206 may be suspended between the rods 202, 204 on basket wires as illustrated in FIG. 1.

In the illustrative embodiment, arm rests (a single arm rest being indicated at 210 in FIG. 2) are pivotably mounted on the hub means 40. The illustrative latch hub 42 is provided with a forwardly and upwardly projecting portion 212 (FIGS. 2 and 4) through which a pivot pin 214 extends. The arm rest 210 is provided with openings 216 to be pivotably mounted on the pivot pin 214. The arm rest 210 is also provided with an enlarged slot portion 218 for receiving the extension of the latch hub 42 upon which the arm rest is mounted. The arm rest is also provided with a laterally-narrow slot 220 for receiving a thinner web portion 222 of the latch hub as the arm rest 210 pivots counterclockwise as viewed in the drawings.

A tray or forward arm rest 226 may be connected to join the distal ends of the arm rests 210 to be in front of the child or folded to its out-of-the-way position shown in broken lines in FIG. 1. A flexible canopy 228 may be mounted on the back for opening and closing movement as illustrated best in FIG. 1. The canopy 28 may illustratively include an inverted U-shaped support 230, the legs of which are pivotably attached to opposite sides of the back 16.

Further to stabilize the front leg unit 26, a stop 234 is provided to engage and limit movement of the front leg unit 26 clockwise about the axis of the pin 120. This stop 234 may be carried on an extension of the latch hub 42 and functions to limit counterclockwise movement of latch hub 42 about pivot 64 during unfolding of the stroller 10. Also, the latch hub 42 may be formed with a radially and outwardly extending rib 236 to limit the movement of the lock handle plate 44 relative to the latch hub 42 about the axis 64. During collapsing of the stroller 10 to the fully collapsed position shown in FIG. 10, the lock handle plate 44 will begin to pivot about axis 64 because it is locked to the push handle 60 which is being pivoted about axis 64. At some point, the leading edge 237 of handle lock plate 44 will engage rib 236 and cause the latch hub 42 to pivot about axis 64 along with the pivoting handle lock plate 44.

The hub means 40, with its above-described features, and particularly with its latch hub 42 for controlling the seat unit 12 and the connection of the seat unit to the frame assembly 24, and its handle lock plate 44 which controls the handle, and with its relationship between the latch hub 42 and the handle lock plate 44, gives the stroller 10 many features not found in conventional strollers. Each of the seat bottom 14 and seat back 16 may be rigid molded plastic panel-shaped items to serve as firm and safe supports which may be padded in a variety of colors and fabrics as desired. This is in contrast to many conventional types of strollers where the seat and back are cloth stretched between the sides, particularly when the stroller is a foldable unit. The stroller 10 may be pushed forwardly (to the right in FIG. 1) or pushed rearwardly (to the left as viewed in FIG. 1) by releasing the handle 60 from slot means 46, 46a and pivoting it about the axis 64 to engage the slot means 48. The back 16 may be raised (i.e., inclined) and lowered (i.e., reclined) by operating the control handle 150 to engage selective slots 134 in the latch hub 42.

Figure 8:
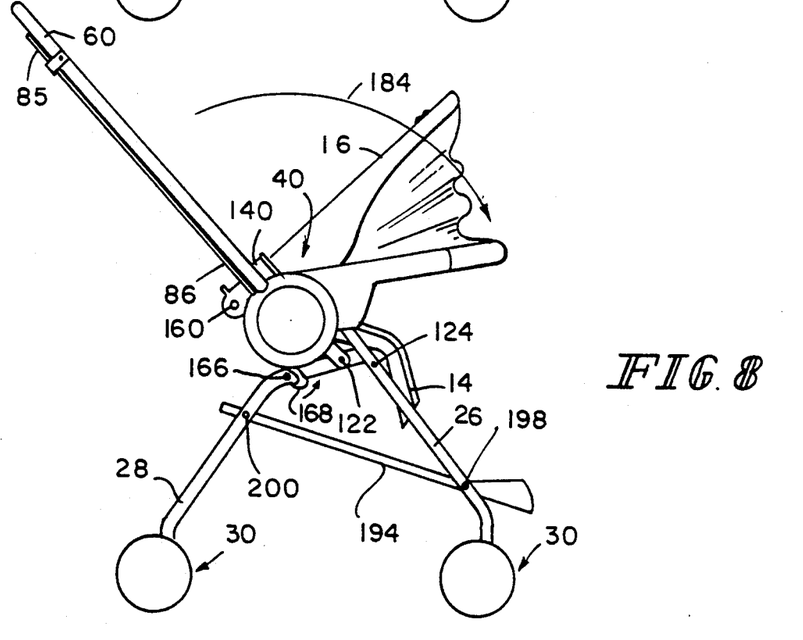
FIG. 8 shows a diagrammatic elevational view of the stroller with the back released for movement toward the seat to start the collapsing action.
Figure 9:
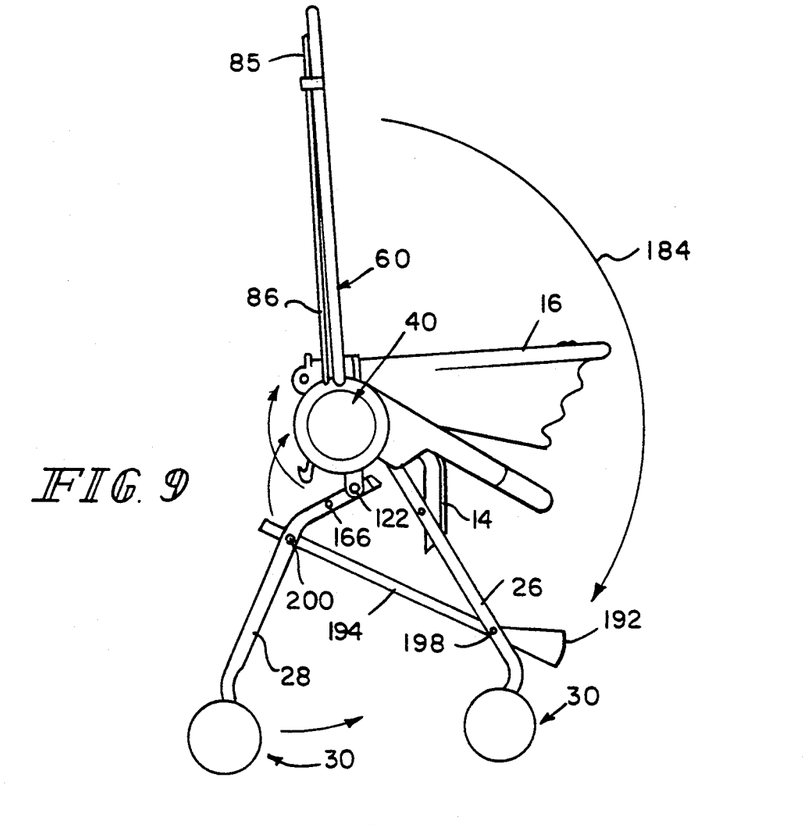
FIG. 9 is a diagrammatical elevational view showing the collapsible frame assembly released from the back for further folding.
Figure 10:
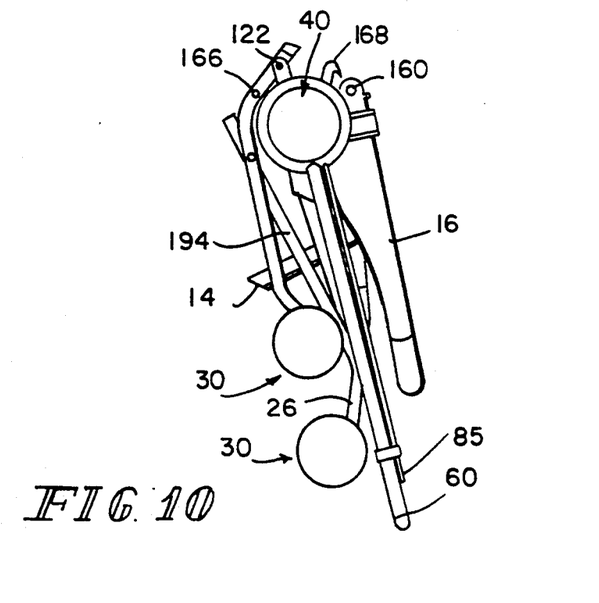
FIG. 10 shows a diagrammatic elevational view of the fully-collapsed and folded stroller of the present invention.

Turning now to FIGS. 7, 8, 9 and 10, it will be seen that the stroller 10 can be released and folded from its use position shown in FIG. 7 to its storage position shown in FIG. 10. This releasing operation is initiated by actuation of the back lock handle 150 shown in FIG. 3 to release the back 16 from latch hub 42 and move it clockwise in direction 184 as indicated in FIGS. 7 and 8. Further movement as indicated at FIG. 8 releases the hook 176 on the hooked lever 168 to pivot and disengage the lock post 166 on the rear leg unit 26 to permit further folding of the frame assembly, and that folding is indicated as being started in FIG. 9. The folding of the back 16 about the hub means 40 thus makes it possible for the push handle 60 to be folded clockwise downwardly as shown in the FIG. 10 position. The spacing of the pivot pins 120,122 for the front and rear leg units 26,28 about the first pivot axis 64 (the axis of the hub means 40), permits the leg units 26, 28, 29 to move as required from the use position of FIG. 7 to the storage position of FIG. 10. This movement, of course, cannot occur until the hook 176 releases the lock post 166 on the rear leg unit 28 and the locking tab 146 releases from the back locking control slots 134 on the latch lug 42.

Although the back 16 is moving relative to the latch hub 42 as the back 16 pivots about axis 64 during collapsing of stroller 10, the spring-loaded tabs 144 on handle 150 mounted on back 16 automatically lockably engage to the back lock slots 134 formed in latch hub 42 when the stroller 10 is fully collapsed as shown in FIG. 10. Thus, back 16 is locked to the hub means 40 when the stroller 10 is fully collapsed. Referring to FIG. 6, such a locking connection is established by engagement of lock tab 144 in the slot 134'. At some point during collapsing movement, the back 16 will "bottom out" on the collapsible frame assembly, yet the latch hub 42 will continue to pivot in direction 135 (see FIG. 6) about axis 64 until slot 134' is aligned with the locking tab 144 on back lock handle 150. Then, because of the load provided by spring 156, the locking tab 144 will be urged into slot 134' to establish this locking connection between back 16 and latch hub 42.

Such a locking connection does not create any problems during unfolding of the stroller 10. In fact, it is desirable because it ensures that the hub means 40 will automatically carry the back 16 to a preferred upright orientation as shown in FIG. 7. To unfold the collapsed stroller 10 from the collapsed position shown in FIG. 10, it is only necessary to grip the push handle 60 and pivot it about the hub means 40 and relative to the frame assembly. It is not necessary to operate the back lock handle 150 to unlock the back 16 from the hub means 40. Pivoting push handle 60 about axis 64 causes the handle lock plate 44 to pivot about axis 64. Also, the latch hub 42 pivots in the same direction at the same time because of frictional engagement between the handle lock plate 44 and the latch hub 42. However, the pivoting motion of the latch hub 42 will stop earlier than the pivoting motion of handle lock plate 44 due to abutting engagement of the stop 234 against the front leg unit 26 in the position shown, for example, in FIG. 5. At about the same time, the locking connection between hooked lever 168 and lock post 166 is reestablished to lock the collapsible frame assembly in its unfolded use position.

Figure 11:
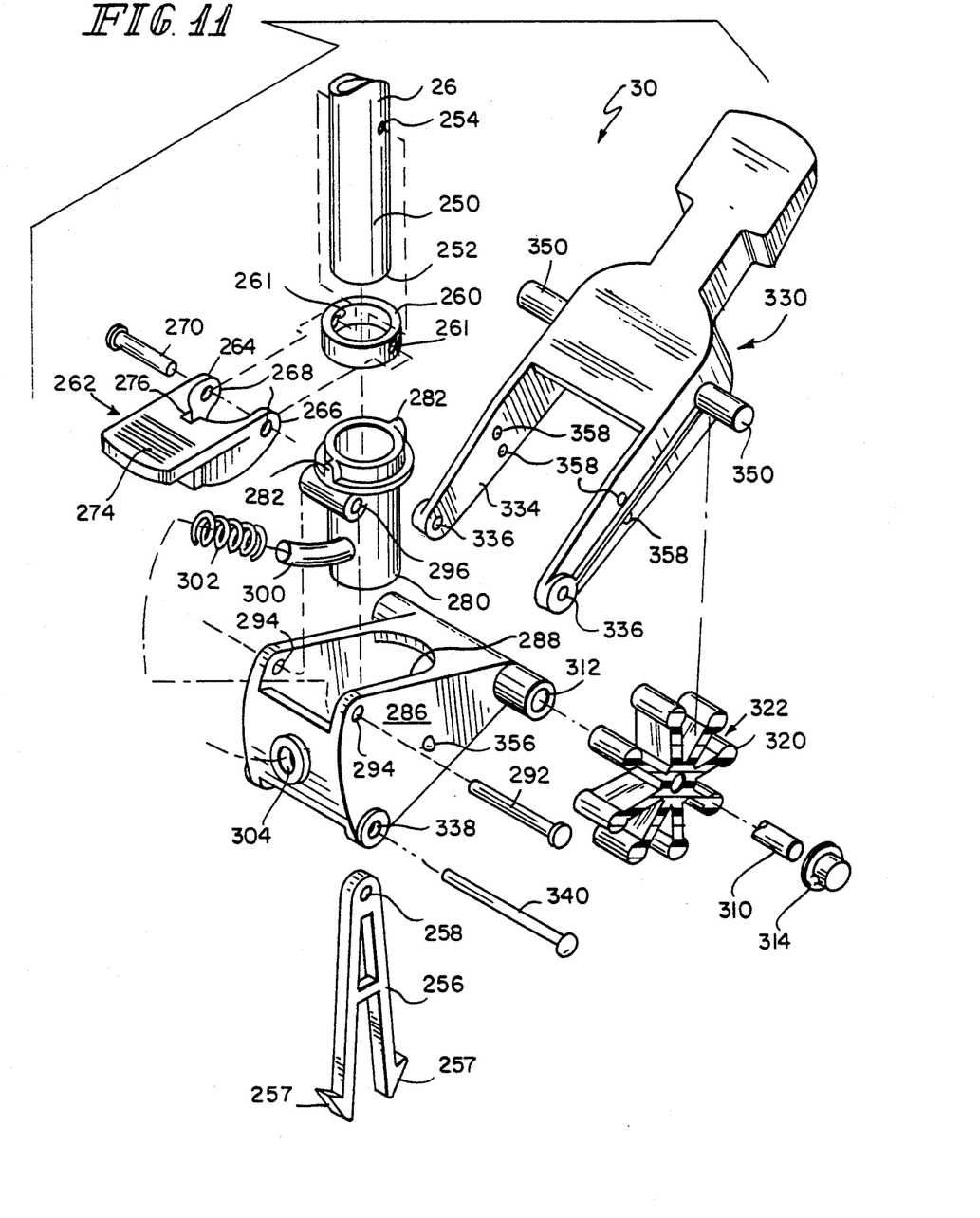
FIG. 11 is an exploded perspective view of the wheel assembly of the present invention.
Figure 12:
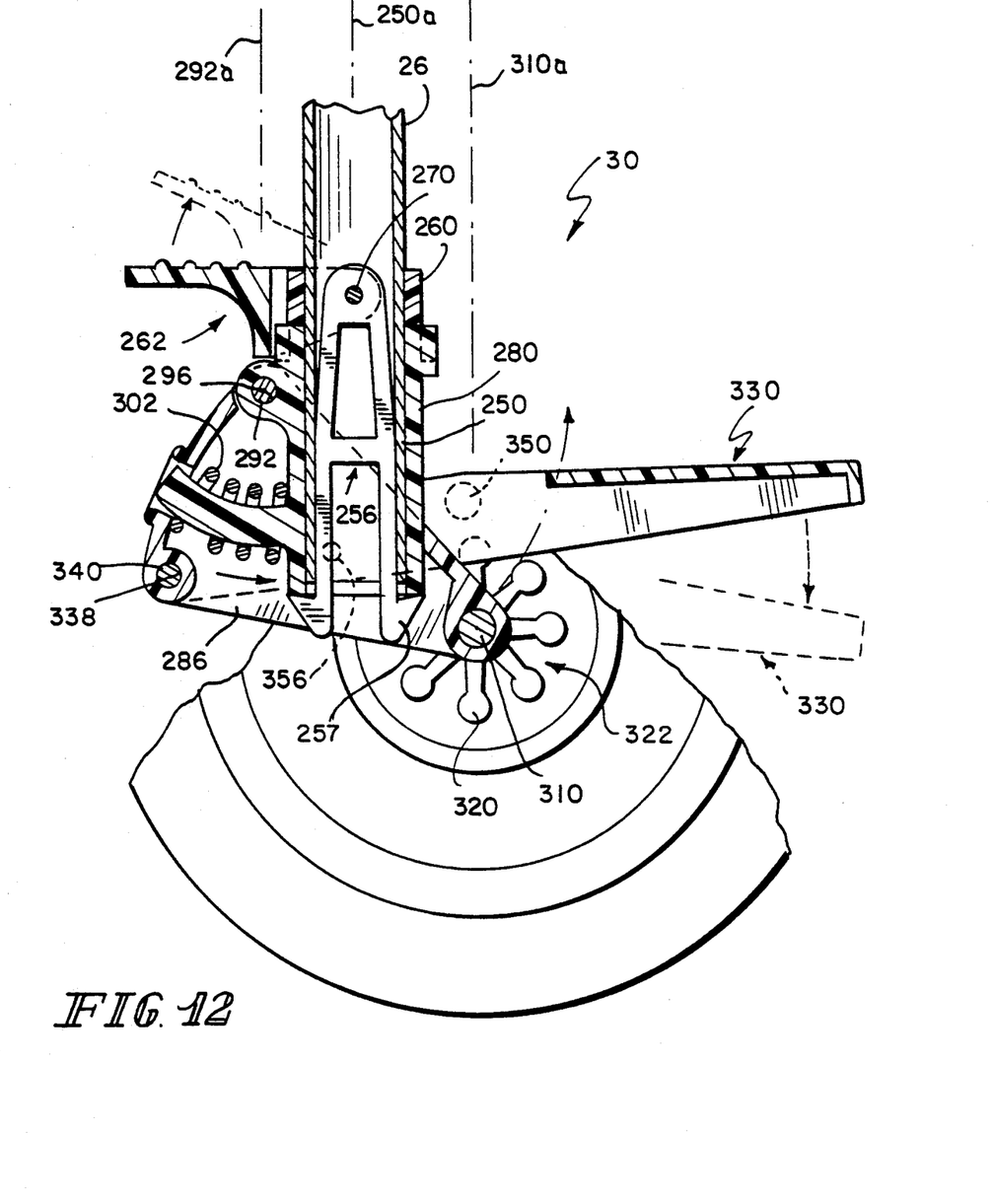
FIG. 12 is a fragmentary sectional view of the wheel assembly of the present invention.

Turning to FIGS. 11 and 12, it will be seen that each wheel means 30 illustrated has special features to facilitate movement of the stroller 10. The illustrative wheel is shown at the lower end of a front leg unit 26, and only one wheel means 30 will be described. The tubular leg member 26 has a lower end portion 250 having a vertical axis 250a and terminating at a lower distal end 252 in a conventional fashion. Spaced upwardly from this lower end is a transaxial hole 254 through the tube for purposes of mounting the wheel means 30.

A snap fastener or holding means 256 having spring-like radially outwardly movable fingers 257 is provided to be inserted upwardly into the lower end portion 250 to hold the wheel means to the leg. This snap fastener 256 has a through opening 258 which will align with the transverse opening 254 in the tube. A collar 260 with transverse diametrically-opposed holes 261 is slid upwardly over the lower end portion 250 to be in alignment with the holes 254. A stop 262 is provided for keeping the wheels from moving about the vertical axis 250a of the lower end portion 250, and this stop has yoke portions 264, 266 with aligned holes 268 as shown. When the stop 262, collar 260 and snap fastener 256 are in place, a pin 270 can be inserted through the holes 254, 258, 261 and 268 to provide an assembly connection. Essentially, the pin 270 holds the collar 260 and stop 262 in position on the lower end portion 250 of the leg. The stop 262 has a foot-actuable protrusion 274 for raising and lowering the stop and a vertical slot 276 best seen in FIG. 11.

A support sleeve 280 is sleeved on the lower end portion 250 of the leg to be up against the collar 260. The support sleeve has diametrically oppositely extending protrusions 282 to be engaged by the slot 276 when the stop 274 is moved downwardly. When this engagement is made, of course, the support sleeve 280 will not rotate about the axis of the leg, thereby to lock the wheel means 30 against swivel action about the leg.

A wheel support member 286 having a central opening 288 for receiving the support sleeve 280 is provided, and wheels 290, one wheel on each side, are journalled on the wheel support member. The wheel support member 286 is mounted on the wheel support sleeve 280 for pivotal movement about a horizontal axis by means of a pivot pin 292 which extends through openings 294 in the wheel support member and an opening 296 formed in the wheel support sleeve. The wheel support sleeve 280 is formed to provide a protrusion or rod 30 extending upwardly and arcuately concentrically about the axis defined by the hole 296, i.e., the pivot axis lined up with vertical axis 292a for the wheel support member 286. A spring 302 is placed over this arcuate protrusion 300 to be captured between the sleeve 280 and the wheel support member 286. The wheel support member 286 is provided with a clearance opening 304 through which the protrusion 300 moves as the member 286 is pivoted about the pin 292 to compress the spring 302. This spring 302 acts as a shock absorber.

The two wheels are mounted on the wheel support member 286 by an axle rod 310 which extends through an offset, horizontally-extending opening 312 in the member 286 and hub caps 314 are provided for holding wheels on the axle 310 at the offset 310a. The illustrative wheels 290 are molded to have a brake portion 320 providing brake slots 322 at a plurality of spots about the wheel. The wheels 290 are stopped, for safety reasons, by a brake actuator 330 which is formed to have a pair of yoke legs 334 on opposite sides of the wheel support member 286. The distal ends of these legs 334 are provided with holes 336 which mate and align with holes 338 in the member 286. A pivot pin 340 extends through the holes 336,338 pivotably to mount the actuator 330 on wheel support member 286. The actuator carries outwardly-extending brake rods 350 which can be moved downwardly into the slots 322 to stop the wheels 390. A detent protrusion 356 extends outwardly from each side of the wheel support member 286 to engage into vertically spaced detent openings 358 in the actuator. Thus, the actuator can be held by the detent protrusion 356 in either of its lower position engaging the brakes or its upper position releasing the brakes.

Although the invention has been described and defined in detail with reference to certain preferred embodiments, variations and modifications exist within the scope and spirit of the invention as described and defined in the following claims.

What is claimed is:

1. A foldable stroller comprising
a seat unit having a seat bottom and a back movable relative to the seat bottom,
a collapsible frame assembly movable between an unfolded use position and a folded storage position,
hub means for attaching the seat unit to the collapsible frame assembly for movement about a first pivot axis relative to the collapsible frame assembly during movement of said assembly between its use and storage positions,
a push handle movable relative to the seat unit between at least two operating positions,
means for pivotably connecting the push handle to the hub means for movement about the first pivot axis relative to the seat unit between said at least two operating positions,
handle locking means on the push handle for normally locking the push handle to the hub means to fix the push handle in one of said operating positions so that the push handle is retained in a predetermined fixed position relative to the hub means, and
means for releasing the locking means to permit movement of the push handle relative to the seat unit to each of said operating positions.

2. A foldable stroller comprising
a seat unit,
a collapsible frame assembly movable between an unfolded use position and a folded storage position,
hub means for attaching the seat unit to the collapsible frame assembly for movement about a first pivot axis relative to the collapsible frame assembly during movement of said assembly between its use and storage positions,
a push handle movable relative to the seat unit between at least two operating positions,
means for pivotably connecting the push handle to the hub means for movement about the first pivot axis relative to the seat unit between said at least two operating positions,
handle locking means on the push handle for normally locking the push handle to the hub means to fix the push handle in one of said operating positions so that the push handle is retained in a predetermined fixed position relative to the hub means, and
means for releasing the locking means to permit movement of the push handle relative to the seat unit to each of said operating positions, wherein the collapsible frame assembly includes a front log unit and a rear leg unit, the front leg unit is pivotably coupled to the hub means for movement about a second pivot axis, the rear leg unit is pivotably coupled to the hub means for movement about a third pivot axis, and the hub means is formed to include first slot means for receiving the handle locking means to establish a first operating position of the push handle and second slot means for receiving the handle locking means to establish a second operating position of the push handle.

3. The stroller of claim 2, wherein the seat unit includes a seat, a back, and means for pivotably coupling the back to the seat for movement about a seat unit pivot axis, and further comprising back locking means for releasably locking the back to the hub means to block movement of the back relative to the collapsible frame assembly.

4. The stroller of the claim 3, wherein the hub means includes third slot means for receiving the back locking means to establish a first fixed position of the back and fourth slot means for receiving the back locking means to establish a second fixed position of the back.

5. The stroller of claim 4, wherein the back locking means includes a handle including a grip portion and a locking tab, means for slidably mounting the handle to the back, and spring means for yieldably urging the locking tab into one of the third and fourth slot means to retain the back in one of its fixed positions.

6. The stroller of claim 2, further comprising seat unit locking means on the seat unit for locking the seat unit to the hub means to block pivoting movement of the seat unit relative to the hub means about said first pivot axis.

7. A foldable stroller comprising
a seat unit,
a collapsible frame assembly movable between an unfolded use position and a folded storage position,
hub means for attaching the seat unit to the collapsible frame assembly for movement about a first pivot axis relative to the collapsible frame assembly during movement of said assembly between its use and storage positions,
a push handle movable relative to the seat unit between at least two operating positions,
means for pivotably connecting the push handle to the hub means for movement about the first pivot axis relative to the seat unit between said at least two operating positions,
handle locking means on the push handle for normally locking the push handle to the hub means to fix the push handle in one of said operating positions so that the push handle is retained in a predetermined fixed position relative to the hub means, and
means for releasing the locking means to permit movement of the push handle relative to the seat unit to each of said operating positions, wherein the hub means is formed to include an interior region and further comprising frame locking means for locking the hub means to the collapsible frame assembly to block movement of the collapsible frame assembly from its unfolded use position to its folded storage position, the frame locking means being situated in the interior region formed in the hub means.

8. The stroller of claim 7, wherein the frame locking means includes a post mounted on the collapsible frame assembly and a hooked lever pivotably mounted on the back lock hub to lie partly in the interior region of the hub means and the hooked lever is pivotable about a lever pivot axis to hook and engage the post mounted on the collapsible frame to lock the collapsible frame in its unfolded use position.

9. The stroller of claim 7, wherein the collapsible frame assembly includes a front leg unit and a rear leg unit, the hub means includes front pivot means for pivotably connecting the hub means to the front leg unit and rear pivot means for pivotably connecting the hub means to the rear leg unit.

10. The stroller of claim 9, wherein the hub means includes a back lock hub and a handle lock plate mounted to lie adjacent to the back lock hub to define the interior region of the hub means therebetween, the back lock hub is situated between the seat unit and the handle lock plate, and the handle lock plate includes the front and rear pivot means.

11. The stroller of claim 10, wherein the handle lock plate is formed to include first slot means for receiving the handle locking means to establish a first operating position of the push handle and second slot means for receiving the handle locking means to establish a second, operating position of the push handle.

12. The stroller of claim 11, wherein the hub housing is arranged to lie between the seat unit and the push handle to position the back lock hub adjacent to the seat unit and the handle lock plate adjacent to the push handle.

13. The stroller of claim 10, further comprising back locking mean for releasably locking the back to the back lock hub to block movement of the back relative to the collapsible frame assembly.

14. The stroller of claim 13, wherein the back locking means includes a locking tab and the back lock hub includes third slot means for receiving the locking tab to establish a first fixed position of the back and fourth slot means for receiving the locking tab to establish a second fixed position of the back.

15. A foldable stroller comprising
a seat unit,
a collapsible frame assembly movable between an unfolded use position and a folded storage position,
hub means for attaching the seat unit to the collapsible frame assembly for movement relative to the collapsible frame assembly during movement of said assembly between its use and storage positions,
a push handle movable relative to the seat unit between at least two operating positions,
means for pivotably connecting the push handle to the hub means for movement about a first pivot axis relative to the seat unit between said at least two operating positions,
handle locking means on the push handle for normally locking the push handle to the hub means to fix the push handle in one of said operating positions so that the push handle is retained in a predetermined fixed position relative to the hub means, and
means for releasing the locking means to permit movement of the push handle relative to the seat unit to each of said operating positions, the hub means including a back lock hub and a handle lock plate mounted to lie adjacent to the back lock hub, the back lock hub being situated between the seat unit and the handle lock plate, and the handle lock plate being formed to include first and second slot means.

16. The stroller of claim 15, wherein the seat unit is pivotably coupled to the back lock hub for movement about the first pivot axis.

17. The stroller of claim 16, wherein the seat unit includes a seat and a back pivotably coupled to the seat, the back lock hub is formed to include a plurality of slots, the seat unit further includes back locking means for locking the back to the back lock hub to block pivoting movement of the back relative to the back lock hub about said first pivot axis, and the back locking means includes a locking tab and means for yieldably biasing the locking tab into one of the plurality of slots formed in the back lock hub.

18. The stroller of claim 15, wherein the handle lock plate includes stop means for limiting the range of angular movement of the push handle relative to the handle lock plate to a predetermined angle that is less than 180°.

19. The stroller of claim 15, wherein the handle locking means includes a handle lock member movable relative to the push handle and spring means for yieldably biasing the handle lock member into one of the first and second slot means formed in the handle lock plate.

20. The stroller of claim 19, wherein the releasing means includes a handle release lever coupled to the handle lock member and means for slidably coupling the handle release lever to the push handle.

21. The stroller of claim 15, wherein the handle lock plate is formed to include a bottom wall orthogonal to said first pivot axis and a curved guide wall appended to the bottom wall and formed to include the first and second slot means therein, the handle locking means includes a handle lock member movable relative to the push handle and spring means coupled to the push handle for yieldably biasing the handle lock member against the curved guide wall during pivoting of the push handle about said first pivot axis so that the handle lock member is urged into one of the first and second slot means formed in the curved guide wall to fix the push in one of its operating positions.

22. The stroller of claim 21, wherein the releasing means includes a handle release lever coupled to the handle lock member and means for slidably coupling the handle release lever to the push handle for movement between a push handle locking position and a push handle releasing position so that the handle release lever is movable relative to the push handle to retract the handle lock member from engagement from one of the first and second slot means against a biasing force provided by the spring means to release the push handle for pivotable movement about the first pivot axis.

23. The stroller of claim 22, wherein the connecting includes a pivot pin that is coupled to the back lock and the push handle to establish said first pivot axis, the handle release lever includes a control rod extending alongside the push handle and a retractor bar coupled to the handle lock member to lie in spaced-apart relation to the pivot pin and movable in a slot formed in the push handle, and the spring means includes a compression spring mounted inside the push handle and arranged to engage the pivot pin and the retractor bar.

24. A foldable stroller comprising
a seat unit,
a collapsible frame assembly movable between an unfolded use position and a folded storage position,
hub means for attaching the seat unit to the collapsible frame assembly for movement about a first pivot axis relative to the collapsible frame assembly during movement of said assembly between its use and storage positions,
a push handle movable relative to the seat unit between at least two operating positions,
means for pivotably connecting the push handle to the hub means for movement about the first pivot axis relative to the seat unit between said at least two operating positions,
handle locking means on the push handle for normally locking the push handle to the hub means to fix the push handle in one of said operating positions so that the push handle is retained in a predetermined fixed position relative to the hub means, and
means for releasing the handle locking means to permit movement of the push handle relative to the seat unit to each of said operating positions, the hub means includes a curved guide wall arranged to lie at a constant radius from the first pivot axis, the handle locking means includes a handle lock member movable relative to the push handle, the curved guide wall is formed to include first slot means for receiving the handle lock member to establish a first operating position of the push handle and second slot means for receiving the handle lock member to establish a second operating position of the push handle, and the handle locking means further includes spring means for yieldably biasing the handle lock member against the curved guide wall during pivoting of the push handle about said first pivot axis so that the handle lock member is urged into one of the first and second slot means formed in the curved guide wall during pivoting of the push handle to fix the push handle in one of its operating positions.

25. The stroller of claim 24, wherein the handle lock member includes a wide channel section slidably receiving a leg of the push handle therein and a narrow nose section sized to fit into each of the first and second slot means.

26. The stroller of claim 25, wherein the handle lock member includes a bottom wall including the narrow nose section and a pair of side walls appended to the bottom wall and arranged to lie in spaced-apart relation to define a push handle leg-receiving channel therebetween, and the releasing means is coupled to at least one of the side walls.

27. The stroller of claim 25, wherein the push handle includes a tubular leg formed to include at least one slot, the releasing means includes a retractor bar coupled to the channel section and arranged to extend through the at least one slot formed in the tubular leg and the spring means engages each of said retractor bar and said means for pivotably connecting the push handle to the hub means so that the narrow nose section is urged into one of the first and second slot means and the wide channel section is urged into engagement with the curved guide wall upon arrival of the narrow nose section at said one of the first and second slot means during pivoting movement of the push handle about the first pivot axis.

28. The stroller of claim 24, wherein the releasing means includes a handle release lever coupled to the handle lock member and means for slidably coupling the handle release lever to the push handle for movement between a push handle locking position and a push handle releasing position so that the handle release lever is movable relative to the push handle to retract the handle lock member from engagement in one of the first and second slot means against a biasing force provided by the spring means to release the push handle for pivotable movement about the first pivot axis.

29. The stroller of claim 28, wherein the connecting means includes a pivot pin coupled to the hub means and the push handle to establish said first pivot axis, and the spring means is a compression spring engaging the pivot pin and the handle release lever.

30. The stroller of claim 29, wherein the handle release lever includes a retractor bar coupled to the handle lock member, and a control rod extending alongside the push handle and through the coupling means to the retractor bar, the spring means includes a compression spring acting against the push handle and the retractor bar, and the handle release lever further includes actuator means for sliding the control rod relative to the push handle to move the retractor bar away from the curved guide wall to withdraw the handle lock member from one of the first and second slot means to release the push handle for pivotable movement about the first pivot axis.

31. The stroller of claim 24, wherein the seat unit includes a seat, a back, and means for pivotably coupling the back to the seat for movement about a seat unit pivot axis, and further comprising back locking means for releasably locking the back to the hub means to block movement of the back relative to the collapsible frame assembly.

32. The stroller of claim 31, wherein the back locking means includes a handle including a grip portion and a locking tab, means for slidably mounting the handle to the back, and spring means for yieldably urging the locking tab into engagement with the hub means to retain the back in a fixed position relative to the collapsible frame assembly.

33. A foldable stroller comprising
a seat unit comprising a back and a seat bottom, said back and seat bottom being relatively movable and said back being collapsible toward said seat bottom as it is moved toward a non-use storage position,
a collapsible frame assembly comprising a front leg unit and a rear leg unit,
a push handle, and
hub means for providing pivot axes for said seat unit, frame assembly, and handle, all of said pivot axes being horizontal and generally parallel,
said hub means also comprising means for locking said frame assembly to said seat unit for the use position and actuating means associated with said back for releasing said locking means when said back is moved toward said non-use storage position.

34. A foldable seat comprising
a seat unit comprising a back and a seat bottom connected to a lower portion of the back for movement about a horizontal seat unit pivot axis,
a collapsible frame assembly comprising a front leg unit and a rear leg unit,
a push handle, and
hub means for providing a plurality of pivot axes, respectively, for said back, front leg unit, rear leg unit, and push handle, all of said pivot axes being horizontal and generally parallel,
said hub means also comprising means for locking said frame assembly to said back for the use position and actuating means associated with said back for releasing said locking means when said back is moved toward a storage position.

* * * * *